United States Patent

Jamieson

[15] 3,702,997

[45] Nov. 14, 1972

[54] HEAD LOADING SYSTEM FOR MAGNETIC MEMORY DISK DRIVES

[72] Inventor: John W. Jamieson, San Leandro, Calif.

[73] Assignee: Diablo Systems, Inc., Hayward, Calif.

[22] Filed: Nov. 15, 1971

[21] Appl. No.: 198,695

[52] U.S. Cl. ....................340/174.1 E, 179/100.2 CA

[51] Int. Cl. ..........................G11b 5/60, G11b 21/12

[58] Field of Search.................340/174.1 C, 174.1 E; 179/100.2 CA, 100.2 P

[56] References Cited

UNITED STATES PATENTS 3,531,788 2/1970 Brown et al.........340/174.1 C
3,368,210 2/1968 Zimmer...............340/174.1 E
3,544,980 12/1970 Appelquist et al..340/174.1 C

*Primary Examiner*—Vincent P. Canney
*Attorney*—Paul D. Flehr et al.

[57] ABSTRACT

A head loading system for a disk drive where levers extend from the support fingers of each of the read/write heads which are coupled to a radially movable carriage. The levers are capable of being contacted with rotatable bails at any position of the head to control the "flying" or loading and raising of the heads. An electromagnet rotates the bails for loading. A return spring acts as fail-safe means in case of power failure to raise the heads from a memory disk at any tracking position. The lever-bail arrangement reduces the mass of the carriage.

5 Claims, 4 Drawing Figures

HEAD LOADING SYSTEM FOR MAGNETIC MEMORY DISK DRIVES

BACKGROUND OF THE INVENTION

The present invention is directed to a head loading system for magnetic memory disk drive apparatus.

In a head loading system it is desirable to reduce the mass of the moving components in order to increase access time. Some prior devices have required mechanical arrangements which added to the mass.

Other prior devices while having somewhat less mass required a reserve electrical energy supply so that in case of a power failure the heads could be raised off of the disks.

OBJECTS AND SUMMARY OF THE INVENTION

It is, therefore, a general object of the present invention to provie an improved head loading system.

It is another object of the invention to provide a system as above which has reduced effective mass.

It is another object of the invention to provide a system as above with fail-safe unloading without an emergency electrical energy supply.

In accordance with the above objects there is provided a head loading system for magnetic memory disk drive apparatus. A carriage is movable in a radial direction relative to the memory disk. A pair of read/write heads is provided. Individual support finger means couple each of the heads to the carriage with each finger means having a relatively rigid portion carrying the head and coupled to the carriage by a relatively flexible portion. This flexibility is in a direction towards and away from the memory disk. A lever extends from the rigid portion in the radial direction. Means are provided for moving the carriage and heads in a radial direction from a retracted position where the heads are moved away from the disk to a predetermined plurality of tracking positions. The heads are biased toward the disk. Rotatable bail means are mounted on fixed pivot points and are capable of contacting the levers throughout movement from the retract position through the tracking positions. The rotating bail means are controlled for allowing the biasing means to load the heads on a rotating disk.

DETAILED DESCRIPTION OF THE PREFERRED EMBODIMENT

Figure 1:
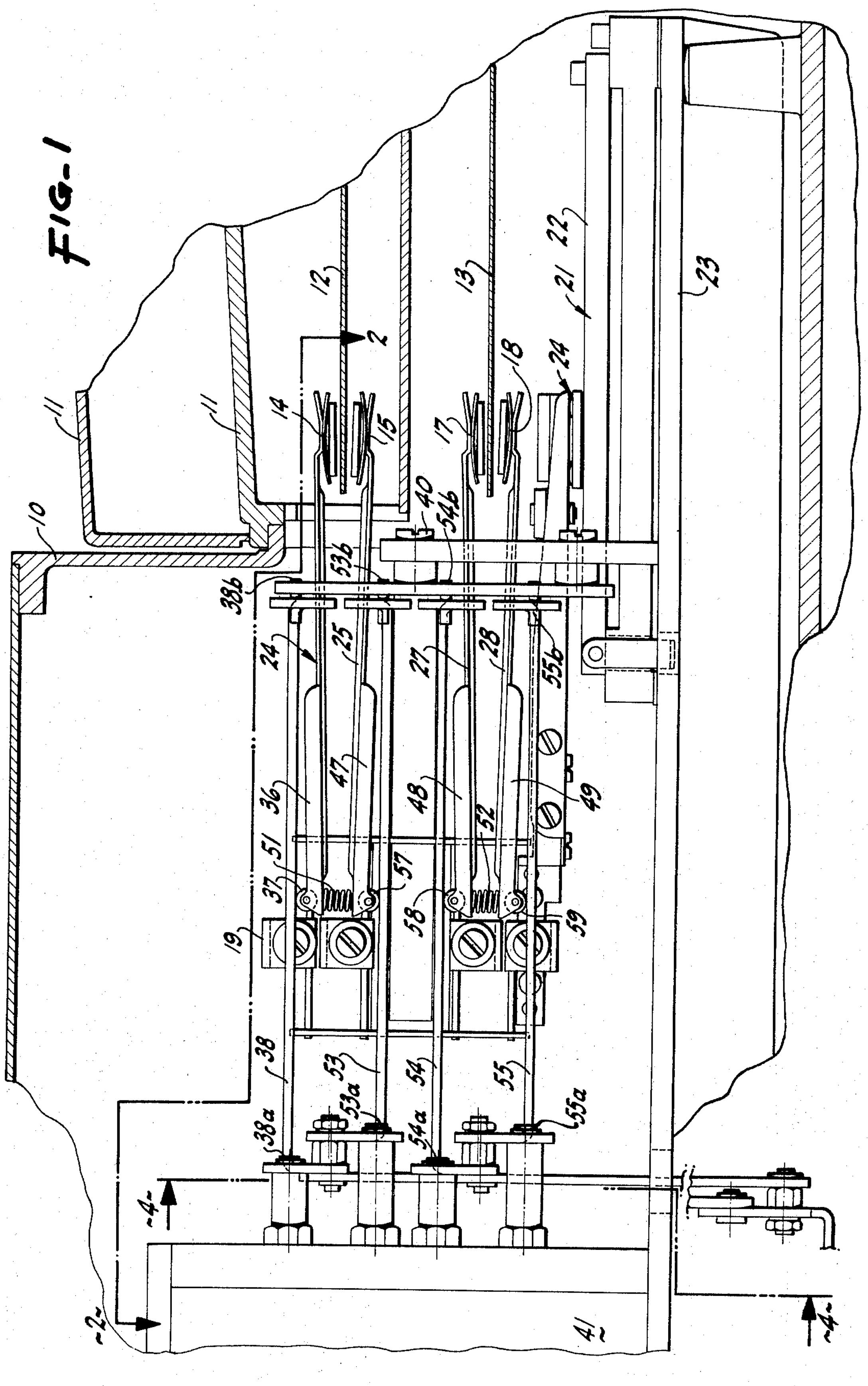
FIG. 1 is a cross-sectional view of a head loading system embodying the present invention.

FIG. 1 illustrates generally a disk drive unit 10 which has inserted in it a removable cartridge 11 having a rotatable magnetic memory disk 12. A fixed rotatable disk 13 is included in unit 10. Disk 12 has positioned over it as illustrated a pair of read/write heads 14, 15 and disk 13 a pair of read/write heads 17, 18. The read/write heads are coupled to a carriage 19 which is movable in a radial direction relative to the memory disk 12 and 13 to retract the heads from the disk or place them over any one of a number of memory tracks on the disk. The positioning of the heads over the track is accomplished by a closed loop servo system which includes a transducer unit 21 having a linear scale 22 affixed to the frame 23 of the disk drive unit 10 and a movable pick-up 24 which is coupled to carriage 19. The operation of transducer 21 is disclosed in a copending application entitled "Temperature Compensation System for a Magnetic Disk Memory Unit," Ser. No. 198,882, filed Nov. 15, 1971, in the name of Andrew Gabor and assigned to the present assignee.

Figures 2, 3:
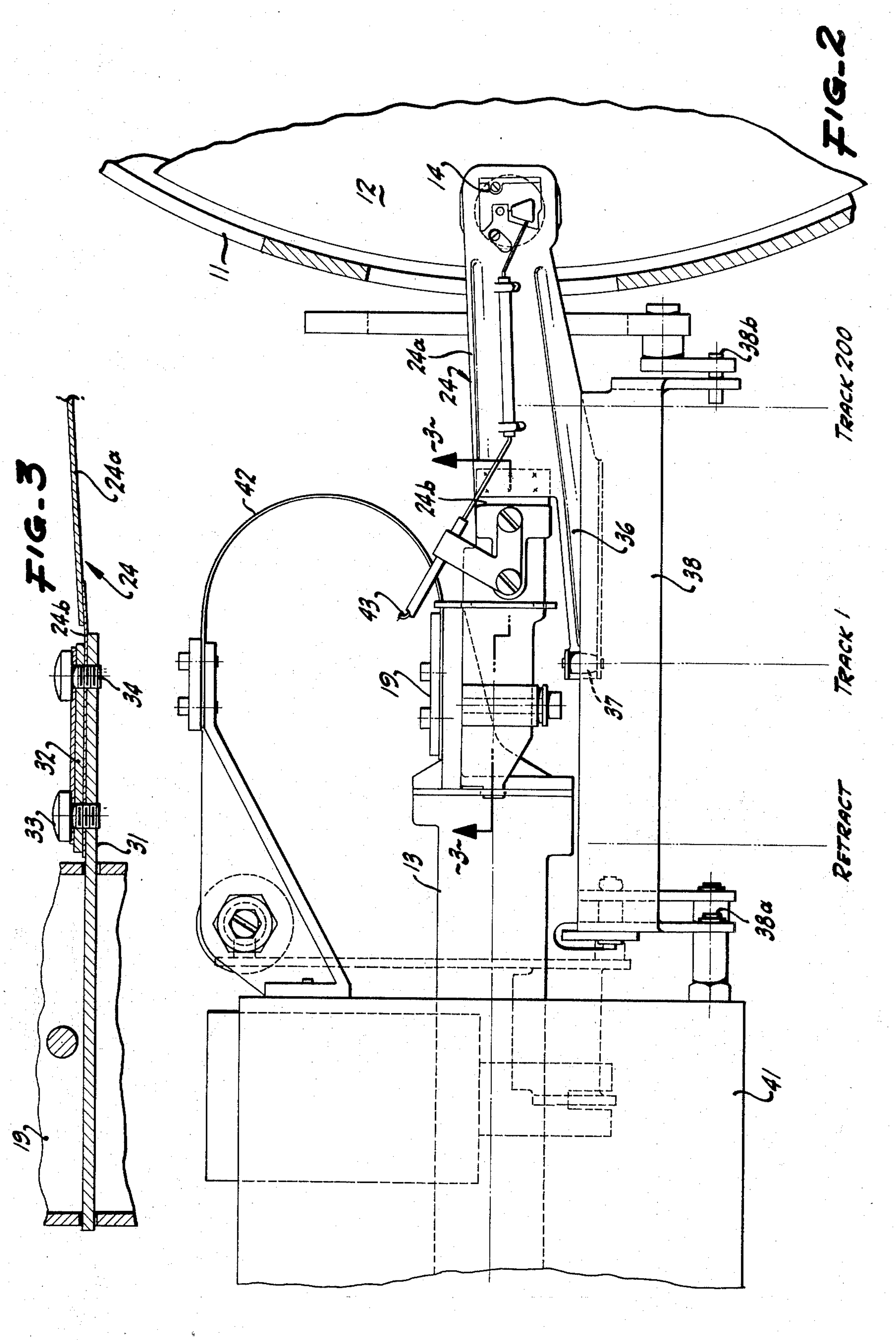
FIG. 2 is a plane view, partially in cross-section taken along line 2—2 of FIG. 1.
FIG. 3 is a cross-sectional view taken along line 3—3 of FIG. 2.

Each of the read/write heads 14, 15 and 17, 18 is coupled to the carriage by individual support fingers 24 and 25 in the case of heads 14, 15 and 27, 28 in the case of heads 17, 18. FIGS. 2 and 3 more fully illustrate the configuration of a particular support finger 24. Representative finger 24 includes a relatively rigid portion **24*a* carrying head 14. It is coupled to carriage 19 by a relatively flexible portion 24*b*. As illustrated more clear in FIG. 3 portion 24*b* in the case of the present invention is merely a sheet of metal of relatively thinner thickness which is clamped on a plate 31 extending from carriage 19 by a plate 32 which is fixed by screws 33 and 34. In order to increase torsional stability flexible portion 24*b* is spot welded as illustrated by the X's 35 in FIG. 2 to a relatively large area of rigid finger support portion 24*a*. Rigid portion 24*a* also has extending from it in a radial direction relative to the rotatable disk 12 a lever 36 which has mounted on its end a roller 37 which is in continuous rolling contact, while the heads are raised, with a rotatable bail 38 which is pivoted at points 38*a* and 38*b***.

Carriage 19 is coupled to a moving coil linear motor 41 which is well known in the art and discussed in the above-mentioned copending application. As illustrated in FIG. 1, carriage 19 is slidably mounted on a rod 40. Briefly, the moving coil motor operates on a principle similar to that of a loudspeaker. When it is coupled to the transducer 21, such motor can move carriage 19 and its associated head 14 in a radial direction from a retract position, as illustrated in FIG. 2 with reference to the center line of roller 37 where all the heads are moved away from the disk to allow the cartridge 11 to be removed from the drive unit, through a predetermined plurality of tracking positions; for example, from track 1 to track 200. The heads are normally loaded at track 1 and at this time "fly" on the disk. Lever 36, therefore, does not contact roller 37. However, during movement between tracks bail 38 is capable of contacting roller 37 at any time in the event of power failure as will be discussed below. Moving coil motor 41 is coupled to an electrical supply through a bendable electrical lead 42. Also an electrical lead 43 provides for connection to head 14.

FIG. 1 illustrates the levers extending from the remainder of the support fingers 25, 27 and 28 as levers 47, 48 and 49, respectively. Each lever includes rollers 57 and 58 and 59 similar to roller 37 at its end. With respect to heads 14 and 15 the ends of the levers 36 and 47 where the rollers are affixed are juxtaposed with each other and a biasing spring 51 is inserted for normally biasing heads 14 and 15 toward disk 12. A spring 52 serves the same function for heads 17, 18. In the case of levers 36 and 47 the bail 38 in an unrotated position prevents the bias of spring 51 from moving the heads 14 and 15 toward the disk 12 or loading them on the disk. However, rotation of the bail and the other associated bails 53, 54 and 55 will allow such loading to take place. The remaining bails 53, 54 and 55 are similarly pivoted as is bail 38 with their pivot points being indicated with *a* and *b* suffixes.

Figure 4:
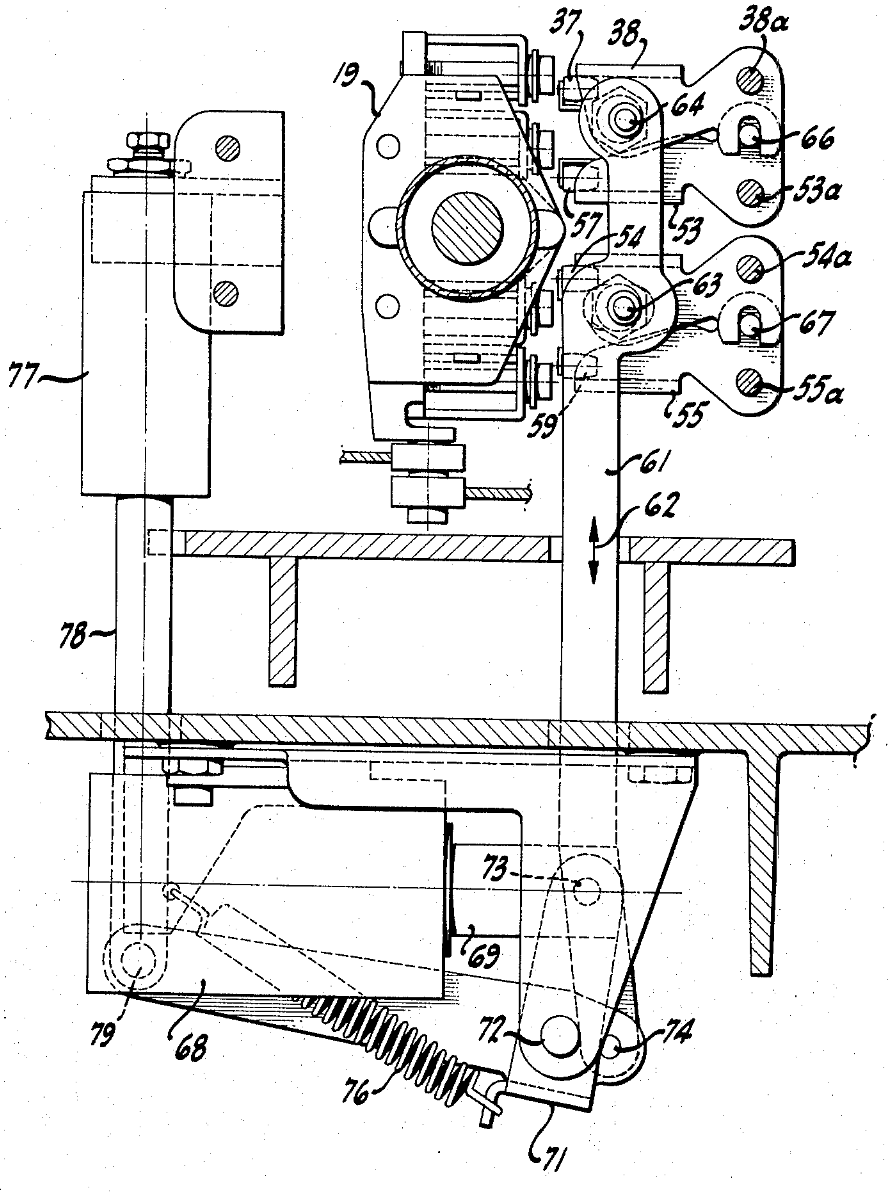
FIG. 4 is an elevational cross-sectional view taken along line 4—4 of FIG. 1.

FIG. 4 illustrates the means for controllably rotating the bails 38, 53, 54 and 55 for raising the heads away from the disk and for loading them. A link 61 movable in the directions as illustrated by the arrow 62 is coupled at a point 63 to the bail 54 and at a point 64 to bail 38. Movement of link 61 in an upward direction will, therefore, rotate bail 38 and bail 54 away from their respective roller to allow springs 51 and 52 between the rollers to load the respective heads on a disk. Rotation of these upper bails is linked to the respective lower bails 53 and 55 by pins 66 and 67. Thus, movement of link 61 upwardly concurrently causes bail pairs 38, 53, 54 and 55 to be rotated to allow head pairs 14, 15 and 17, 18 to be concurrently loaded on their respective memory disks 12 and 13.

Link 61 is moved upwardly by the energization of an electromagnet or solenoid 68 having a plunger 69 which rotates a bell crank 71 counter clockwise around a pivot point 72. Bell crank 71 is coupled to plunger 69 at movable pivot point 73. Link 61 is coupled to bell crank 71 at movable pivot point 74 so that when the solenoid 68 is energized link 61 is moved upwardly. However, this movement occurs against the bias of a spring 76 and also is controlled by a dash pot 77 having a plunger 78 which is coupled to bell crank 71 at movable pivot point 79. This controls the speed of the loading of the heads on the disk. Too slow a loading speed causes the heads to be unstable and too fast a loading speed would tend to cause the heads to slap the disk. In both cases, damage might occur. Spring 76 acts as an energy reserve and acts to provide a fail-safe method in case electrical power should be lost. In that case, spring 76 would return or move link 61 downwardly to rotate the bails to cause heads to be spaced upwardly from the disk. This is of crucial importance in a power failure since during actual use the read/write heads are spaced a microscopic distance from the disk by an air cushion caused by the disk rotation.

Thus, the present invention has provided an improved head loading system. The mass on carriage 19 is reduced since the lever arrangements such as the bails are separate from the carriage. Moreover, since the levers extending from the support fingers can contact the bails for the total range of movement of the carriage and the heads, in the event of power failure the heads can be raised from the disk any time by the action of the return spring which is coupled to the actuating solenoid.

I claim:

1. A head loading system for magnetic memory disk drive apparatus comprising: a carriage movable in a radial direction relative to a memory disk; a pair of read/write heads; individual support finger means for coupling each of said heads to said carriage each finger means having a relatively rigid portion carrying said head and being coupled to said carriage by a relatively flexible portion which is flexible in a direction towards and away from a memory disk; a lever extending in said radial direction from each of said rigid portions; means for moving said carriage and said heads in a radial direction from a retracted position where said heads are moved away from said disk to a predetermined plurality of tracking positions; means for biasing said heads toward said disk; rotatable bail means mounted on fixed pivot points and capable of contacting said levers throughout movement of said heads from said retract position through said tracking positions; and means for controllably rotating said bail means for allowing said biasing means to load said heads on a rotation disk.

2. A system as in claim 1 where said means for controllably rotating said bail means includes spring means for biasing said bail means toward an unrotated position where said heads are spaced upwardly from said disk.

3. A system as in claim 2 where said rotating means also includes an electromagnet for overcoming said biasing of said spring means to load said heads.

4. A system as in claim 1 where said means for biasing said heads towards said disk includes spring means between opposed pairs of said extending levers.

5. A system as in claim 1 where said levers include rollers for contacting said bail means.

* * * * *